United States Patent
Morita et al.

(10) Patent No.: US 10,369,858 B2
(45) Date of Patent: Aug. 6, 2019

(54) SUSPENSION CONTROLLER AND SUSPENSION APPARATUS

(71) Applicant: Showa Corporation, Gyoda-shi (JP)

(72) Inventors: Takumi Morita, Haga-gun (JP); Hiroaki Kurihara, Haga-gun (JP); Masaki Sugimoto, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 128 days.

(21) Appl. No.: 15/466,155

(22) Filed: Mar. 22, 2017

(65) Prior Publication Data
US 2017/0282668 A1 Oct. 5, 2017

(30) Foreign Application Priority Data

Mar. 29, 2016 (JP) .................................. 2016-066912

(51) Int. Cl.
*B60G 17/015* (2006.01)
*B60G 17/018* (2006.01)
(Continued)

(52) U.S. Cl.
CPC ....... *B60G 17/0182* (2013.01); *B60G 17/002* (2013.01); *B60G 17/018* (2013.01);
(Continued)

(58) Field of Classification Search
CPC .... B60G 17/08; B60G 17/018; B60G 17/019; F16F 9/53
(Continued)

(56) References Cited

U.S. PATENT DOCUMENTS 5,968,102 A 10/1999 Ichimaru et al.
6,016,454 A * 1/2000 Ichimaru .............. B60G 17/015
280/5.514
(Continued)

FOREIGN PATENT DOCUMENTS

JP 10-119529 A 5/1998
JP 2009-023377 A 2/2009
WO WO-2015/098217 A 7/2015

OTHER PUBLICATIONS

Extended European Search Report dated Jul. 25, 2017 for the corresponding European Patent Application No. 17162527.0.

*Primary Examiner* — Thomas G Black
*Assistant Examiner* — Wae L Louie
(74) *Attorney, Agent, or Firm* — Leason Ellis LLP

(57) ABSTRACT

A suspension controller includes a target current setting unit, a current limitation setting unit, a current outputting unit, a current detector, and an estimated temperature calculator. The target current setting unit sets a target current value. The current limitation setting unit sets a current limitation value. The current outputting unit supplies a solenoid with a current that is based on the target current value, the current limitation value, and a power supply voltage. The solenoid controls a damping force of a suspension. The current detector detects a current value of the current supplied to the solenoid. The estimated temperature calculator calculates an estimated temperature of the solenoid based on the current value detected by the current detector so that the current limitation setting unit changes the current limitation value based on the estimated temperature.

19 Claims, 12 Drawing Sheets

(51) Int. Cl.
  *B60G 17/019* (2006.01)
  *B60G 17/08* (2006.01)
  *B60G 17/00* (2006.01)

(52) U.S. Cl.
  CPC ......... *B60G 17/019* (2013.01); *B60G 17/08* (2013.01); *B60G 2202/24* (2013.01); *B60G 2204/424* (2013.01); *B60G 2400/71* (2013.01); *B60G 2400/7162* (2013.01); *B60G 2400/90* (2013.01); *B60G 2500/104* (2013.01); *B60G 2500/106* (2013.01); *B60G 2500/11* (2013.01); *B60G 2600/02* (2013.01); *B60G 2600/09* (2013.01); *B60G 2600/181* (2013.01); *B60G 2600/26* (2013.01); *B60G 2800/70* (2013.01)

(58) Field of Classification Search
  USPC .............................................. 701/37, 40, 41
  See application file for complete search history.

(56) References Cited

U.S. PATENT DOCUMENTS

| | | | |
|---|---|---|---|
| 8,798,859 B2* | 8/2014 | Uchino | B60G 17/06 701/40 |
| 9,682,602 B2* | 6/2017 | Morita | B60G 17/015 |
| 2013/0275003 A1* | 10/2013 | Uchino | B60G 17/06 701/40 |
| 2016/0159188 A1* | 6/2016 | Mohamed | B60G 17/019 701/37 |
| 2016/0214454 A1* | 7/2016 | Morita | B60G 17/015 |
| 2017/0282666 A1* | 10/2017 | Sugimoto | B60G 17/0152 |

* cited by examiner

SUSPENSION CONTROLLER AND SUSPENSION APPARATUS

CROSS-REFERENCE TO RELATED APPLICATIONS

The present application claims priority under 35 U.S.C. § 119 to Japanese Patent Application No. 2016-066912, filed Mar. 29, 2016. The contents of this application are incorporated herein by reference in their entirety.

BACKGROUND

Field

The present invention relates to a suspension controller and a suspension apparatus.

Background

Suspension controllers that control damping force of a suspension with a solenoid have been proposed.

Japanese Unexamined Patent Application Publication No. 2009-23377 (published on 5 Feb. 2009) discloses a technique for regulating the maximum current supplied to power consuming components of a variable damping force damper used in a suspension.

SUMMARY

According to one aspect of the present invention, a suspension controller includes a target current setting unit, a current limitation setting unit, a current outputting unit, a current detector, and an estimated temperature calculator. The target current setting unit is configured to set a target current value. The current limitation setting unit is configured to set a current limitation value. The current outputting unit is configured to supply a solenoid with a current that is based on the target current value, based on the current limitation value, and based on a power supply voltage. The solenoid is configured to control a damping force of a suspension. The current detector is configured to detect a current value of the current supplied to the solenoid. The estimated temperature calculator is configured to calculate an estimated temperature of the solenoid based on the current value detected by the current detector so that the current limitation setting unit changes the current limitation value based on the estimated temperature.

According to another aspect of the present invention, a suspension controller includes target current setting units, current limitation setting units, current outputting units, current detectors, and estimated temperature calculators. Each of the target current setting units corresponds to one of a plurality of suspensions of a vehicle and is configured to set a target current value. Each of the current limitation setting units corresponds to one of the plurality of suspensions and is configured to set a current limitation value. Each of the current outputting units corresponds to one of the plurality of suspensions and is configured to supply an associated solenoid with a current that is based on the target current value, based on the current limitation value, and based on a power supply voltage. The solenoid is one of solenoids that are configured to control damping forces of the plurality of suspensions. Each of the current detectors corresponds to one of the plurality of suspensions and is configured to detect a current value of the current supplied to the associated solenoid. Each of the estimated temperature calculators corresponds to one of the plurality of suspensions and is configured to calculate an estimated temperature of the associated solenoid based on the current value detected by the current detector. The current limitation setting unit corresponding to the one suspension is configured to: change the current limitation value based on the estimated temperature calculated by the estimated temperature calculator; and set, as a new current limitation value corresponding to the one suspension, a lowest current limitation value among current limitation values respectively corresponding to the suspensions.

According to the other aspect of the present invention, a suspension apparatus includes a suspension, a solenoid, and a suspension controller. The solenoid is configured to control a damping force of the suspension. The suspension controller includes a target current setting unit, a current limitation setting unit, a current outputting unit, a current detector, and an estimated temperature calculator. The target current setting unit is configured to set a target current value. The current limitation setting unit is configured to set a current limitation value. The current outputting unit is configured to supply a solenoid with a current that is based on the target current value, based on the current limitation value, and based on a power supply voltage. The solenoid is configured to control a damping force of a suspension. The current detector is configured to detect a current value of the current supplied to the solenoid. The estimated temperature calculator is configured to calculate an estimated temperature of the solenoid based on the current value detected by the current detector so that the current limitation setting unit changes the current limitation value based on the estimated temperature.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
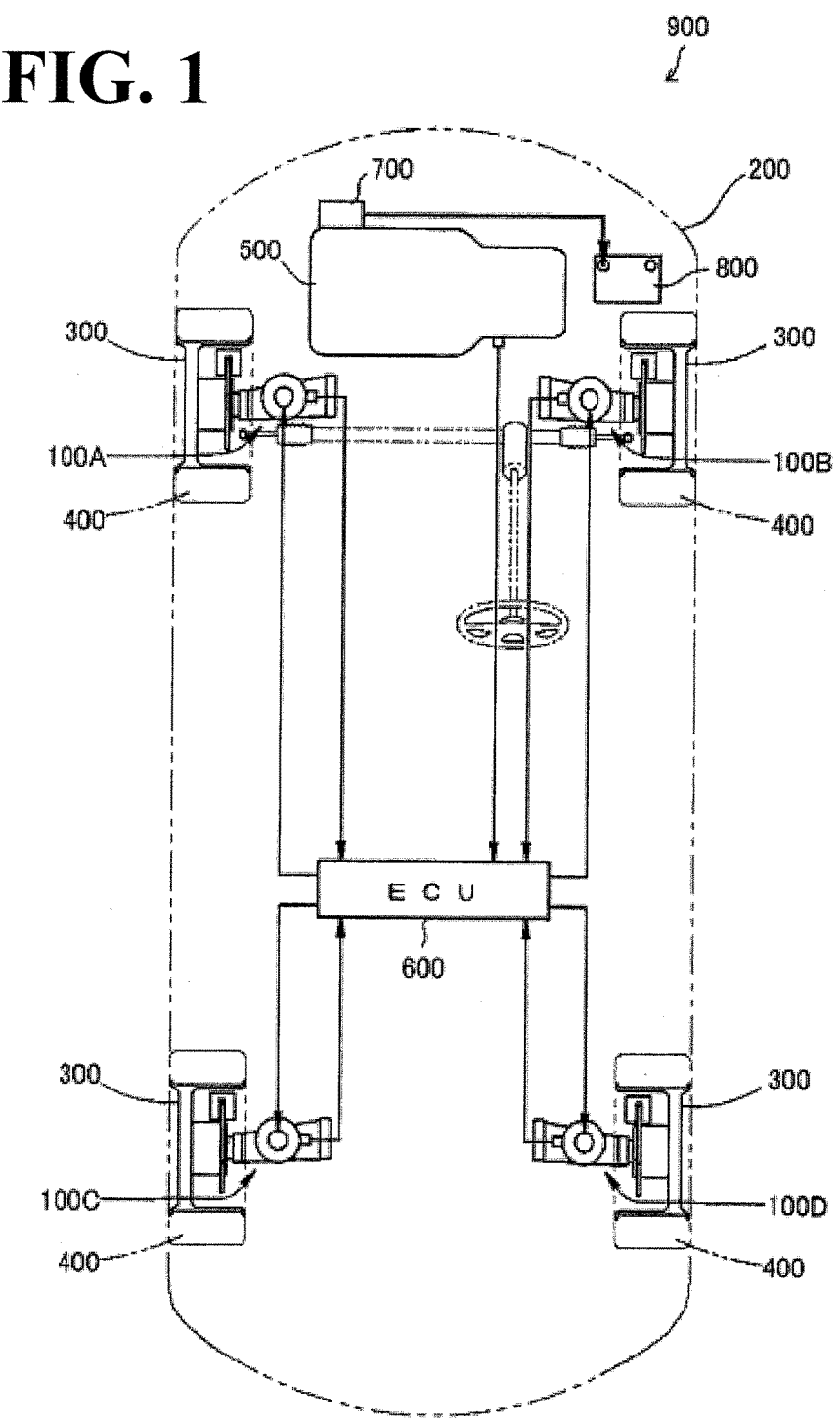
FIG. 1 illustrates a schematic configuration of a vehicle according to a first embodiment of the present invention.

The embodiments will now be described based on the accompanying drawings, wherein like reference numerals designate corresponding or identical elements throughout the various drawings.

First Embodiment

A first embodiment of the present invention will now be described in detail.
Configuration of Vehicle 900

FIG. 1 is a diagram illustrating a schematic configuration of a vehicle 900 according to this embodiment. As illustrated in FIG. 1, the vehicle 900 includes suspensions 100, a vehicle body 200, wheels 300, tires 400, an engine 500, an electronic control unit (ECU) 600 (or a suspension controller 600), a power generator 700, and a battery 800.

The wheels 300 on which the tires 400 are mounted are suspended from the vehicle body 200 with the suspensions 100. Since the vehicle 900 is a four-wheeled vehicle in this embodiment, the number of the suspensions 100, the wheels 300, and the tires 400 is four each.

The suspensions 100 include a suspension 100A for a front left wheel, a suspension 100B for a front right wheel, a suspension 100C for a rear left wheel, and a suspension 100D for a rear right wheel.

The power generator 700 is attached to the engine 500, and electric power generated by the power generator 700 is stored in the battery 800.

Various electronic devices of the vehicle 900 are subject to centralized control by the ECU 600. As will be discussed below, opening and closing of a solenoid valve 50 (see FIG. 2) of a hydraulic shock absorber 1 in each of the suspensions 100 is controlled by the ECU 600. To enable such a control, electric wires are provided to supply driving power from the ECU 600 to the solenoid valves 50.

The ECU 600 and the suspensions 100, which are controlled by the ECU 600, are also referred to as a suspension apparatus.
Configuration of Suspensions 100

Figure 2:
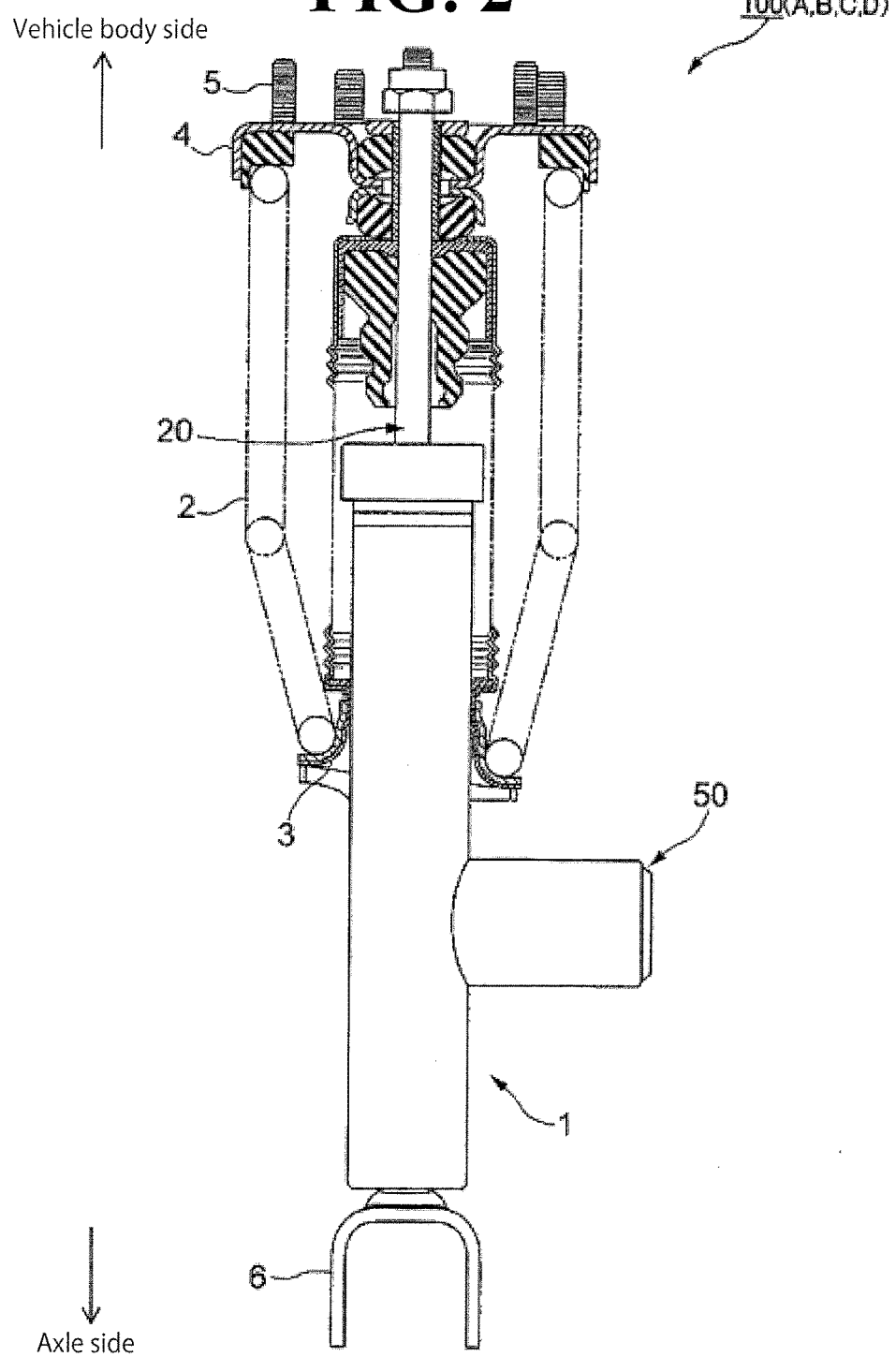
FIG. 2 is a side view of a suspension according to the first embodiment of the present invention.

FIG. 2 is a side view of one of the suspensions 100. Since the suspensions 100A, 100B, 100C, and 100D essentially have the same configuration, the configuration of the suspension 100A will be described. As illustrated in FIG. 2, the suspension 100 includes the hydraulic shock absorber 1 and a coil spring 2. The coil spring 2 is located outside of the hydraulic shock absorber 1. The coil spring 2 is held between a spring seat 3 and a spring seat 4. One end of the suspension 100 is secured to the vehicle body 200 with bolts 5, and the other end of the suspension 100 is secured to the axle of the wheel 300 with an axle side mounting portion 6.

An impact that the vehicle 900 receives from a road surface is absorbed by compression of the coil spring 2. The hydraulic shock absorber 1 generates force (damping force) that damps kinetic energy of the coil spring 2.

Figure 3:
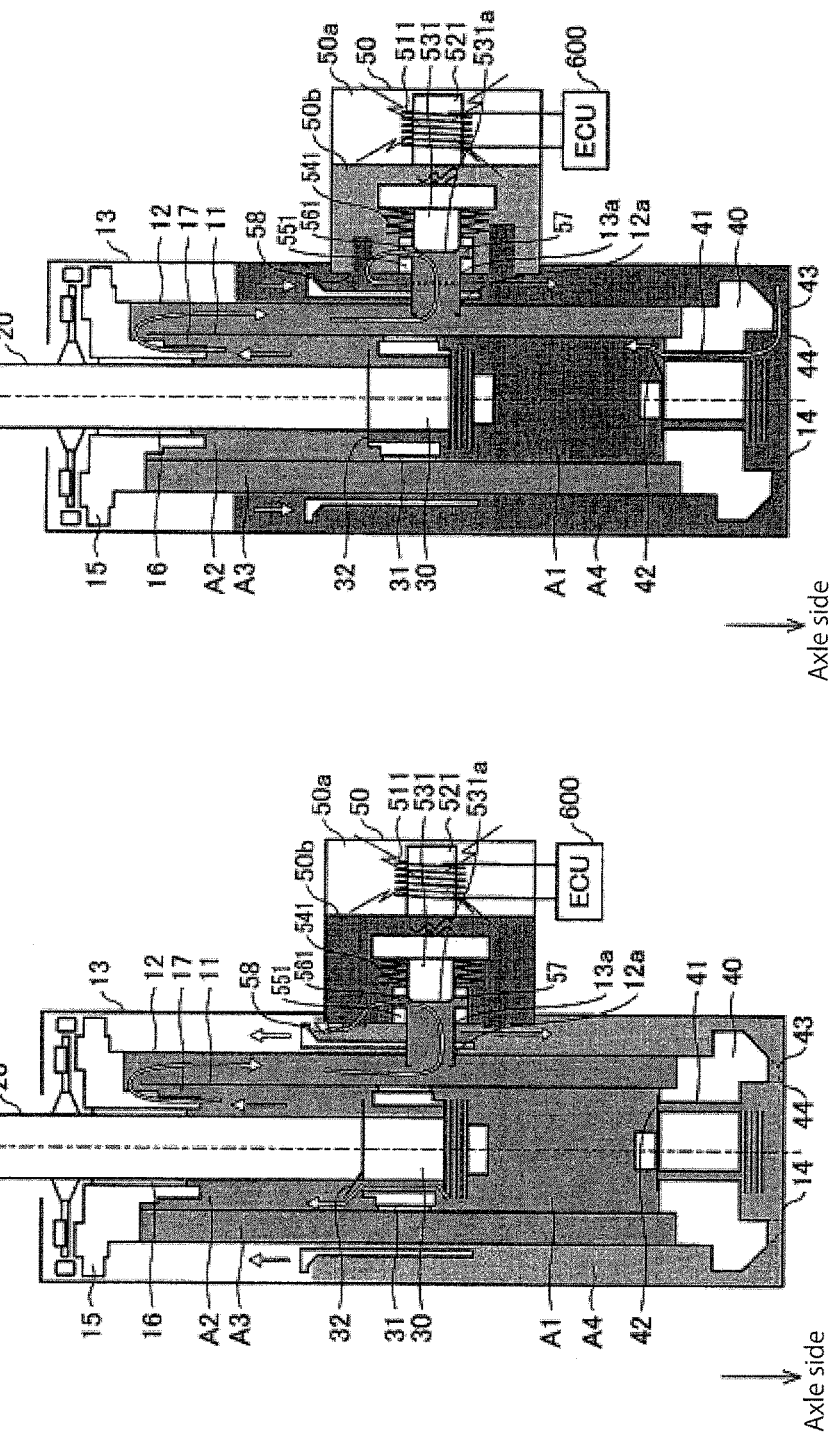
FIGS. 3A and 3B are cross-sectional views of a hydraulic shock absorber according to the first embodiment of the present invention.

FIGS. 3A and 3B are cross-sectional views of the hydraulic shock absorber 1. As illustrated in FIGS. 3A and 3B, the hydraulic shock absorber 1 has a three-tube structure. The hydraulic shock absorber 1 includes a first cylinder 11, a second cylinder 12, and a damper case 13. The second cylinder 12 is located outside of the first cylinder 11. The damper case 13 is located outside of the second cylinder 12. The first cylinder 11, the second cylinder 12, and the damper case 13 are coaxially arranged with one another.

The first cylinder 11 receives a piston rod 20. The piston rod 20 includes a piston 30 located at the distal end of the piston rod 20. The piston 30 slides against the inner wall surface of the first cylinder 11. The first cylinder 11 stores hydraulic oil in the internal space of the first cylinder 11. The internal space is divided by the piston 30 into a piston side oil chamber A1 and a rod side oil chamber A2.

The ends of the first cylinder 11 and the second cylinder 12 close to the axle abut against a bottom unit 40. The ends of the first cylinder 11 and the second cylinder 12 close to the vehicle body abut against a rod guide 15. The bottom unit 40 and the rod guide 15 define the ends of the oil chambers formed inside the first cylinder 11 and the second cylinder 12.

The rod guide 15 has an opening 16. The piston rod 20 is inserted in the opening 16.

The outer wall surface of the first cylinder 11 and the inner wall surface of the second cylinder 12 define a ring-shaped oil chamber A3. The rod guide 15 and the end of the first cylinder 11 close to the vehicle body define a common passage 17. The ring-shaped oil chamber A3 and the rod side oil chamber A2 communicate each other via the common passage 17.

The outer wall surface of the second cylinder 12 and the inner wall surface of the damper case 13 define a reservoir chamber A4. The reservoir chamber A4 stores hydraulic oil that compensates for the volume of the piston rod 20 that moves in and out of the first cylinder 11.

The damper case 13 has a solenoid valve 50 on a side portion of the damper case 13. The solenoid valve 50 is an electromagnetic valve that adjusts the damping force generated in the hydraulic shock absorber 1. The solenoid valve 50 is secured to a lateral passage 57 with a valve stopper 551. The lateral passage 57 extends through the wall of the second cylinder 12 and the wall of the damper case 13.

The hydraulic oil flows into the internal portion of the solenoid valve 50 from the ring-shaped oil chamber A3 through one of openings of the lateral passage 57. The other opening of the lateral passage 57 receives a valve body 531. The valve body 531 has a protrusion 531a. The valve body 531 adjusts the opening area of damping passages 561. The damping passages 561 extend through the wall of the lateral passage 57 and the valve stopper 551. More specifically, the protrusion 531a is fitted to the inner wall of the lateral passage 57. Changes in the relative position of the protrusion 531a with respect to the openings of the damping passages 561 adjust the opening area of the damping passages 561. In an example illustrated in FIGS. 3A and 3B, the plurality of damping passages 561 are formed. However, the number of the damping passage 561 may be at least one.

The hydraulic oil that has passed through the damping passages 561 flows into a cylindrical oil chamber 50b. The cylindrical oil chamber 50b is defined by the housing of the solenoid valve 50. The hydraulic oil that has flowed into the cylindrical oil chamber 50b flows into the reservoir chamber A4 through a discharge port 58.

The solenoid valve 50 includes a coil 511 and a core 521. The coil 511 and the core 521 are solenoid mechanisms. Supplying power to the coil 511 generates electromagnetic force that separates the valve body 531 from the core 521. The coil 511 and the core 521 are accommodated in a control chamber 50a. The control chamber 50a is separated from the cylindrical oil chamber 50b, in which the valve body 531 is located.

The electromagnetic valve for adjusting the damping force of the hydraulic shock absorber 1 may be any electromagnetic valve other than a solenoid valve. For example, the above-described electromagnetic valve may be any electromagnetic valve that uses electromagnetic fluid (magnetic fluid).

The valve stopper 551 and the valve body 531 sandwich a spring 541. The spring 541 exerts spring force in a direction to increase the distance between the valve stopper 551 and the valve body 531. The existence of the spring 541 prevents the valve body 531 from colliding with the valve stopper 551 when the valve body 531 moves in a direction to approach the valve stopper 551.

The piston 30 includes a compression side passage 31. The compression side passage 31 allows hydraulic oil to flow from the piston side oil chamber A1 to the rod side oil chamber A2. The compression side passage 31 has a compression side check valve 32 located at the opening close to the vehicle body.

The bottom unit 40 includes a rebound side passage 41. The rebound side passage 41 allows hydraulic oil to flow from the reservoir chamber A4 to the piston side oil chamber A1. The rebound side passage 41 has a rebound side check valve 42 located at the opening close to the vehicle body. The bottom unit 40 has a ring-shaped protrusion 43 formed on the surface close to the axle. The ring-shaped protrusion 43 projects toward a bottom portion 14 of the damper case 13 and contacts the bottom portion 14. The ring-shaped protrusion 43 includes a bottom portion passage 44. The hydraulic oil in the reservoir chamber A4 flows toward the rebound side passage 41 through the bottom portion passage 44.

Flow of Hydraulic Oil in Compression Stroke

When the vehicle 900 receives an impact force from a road surface, the piston rod 20 enters inside the first cylinder 11 (compression stroke). Upon the above operation, the piston 30 compresses the hydraulic oil in the piston side oil chamber A1. The compressed hydraulic oil flows through the compression side passage 31, opens the compression side check valve 32, and flows into the rod side oil chamber A2.

When the piston rod 20 enters inside the first cylinder 11, the volume of the first cylinder 11 is reduced. Thus, the hydraulic oil in the rod side oil chamber A2 flows through the common passage 17 into the ring-shaped oil chamber A3. The hydraulic oil that has flowed into the ring-shaped oil chamber A3 flows through the lateral passage 57 into the solenoid valve 50 and passes through the damping passages 561. The protrusion 531a of the valve body 531 regulates the opening areas of the damping passages 561. Thus, when the hydraulic oil passes through the damping passages 561, damping force is generated.

The hydraulic oil that has flowed through the damping passages 561 into the cylindrical oil chamber 50b flows through the discharge port 58 into the reservoir chamber A4.

Flow of Hydraulic Oil in Rebound Stroke

When the piston rod 20 moves out from the first cylinder 11 (rebound stroke), the piston 30 pushes out the hydraulic oil in the rod side oil chamber A2. The hydraulic oil passes through the common passage 17 and flows into the ring-shaped oil chamber A3. The hydraulic oil that has flowed into the ring-shaped oil chamber A3 passes through the lateral passage 57 and the damping passages 561 like in the compression stroke and generates damping force.

The hydraulic oil that has flowed through the damping passages 561 into the cylindrical oil chamber 50b flows through the discharge port 58 into the reservoir chamber A4.

When the piston rod 20 moves toward the outside of the first cylinder 11, the piston side oil chamber A1 has a negative pressure. Thus, the hydraulic oil in the reservoir chamber A4 passes through the bottom portion passage 44 and the rebound side passage 41, opens the rebound side check valve 42, and flows into the piston side oil chamber A1.

Figure 4:
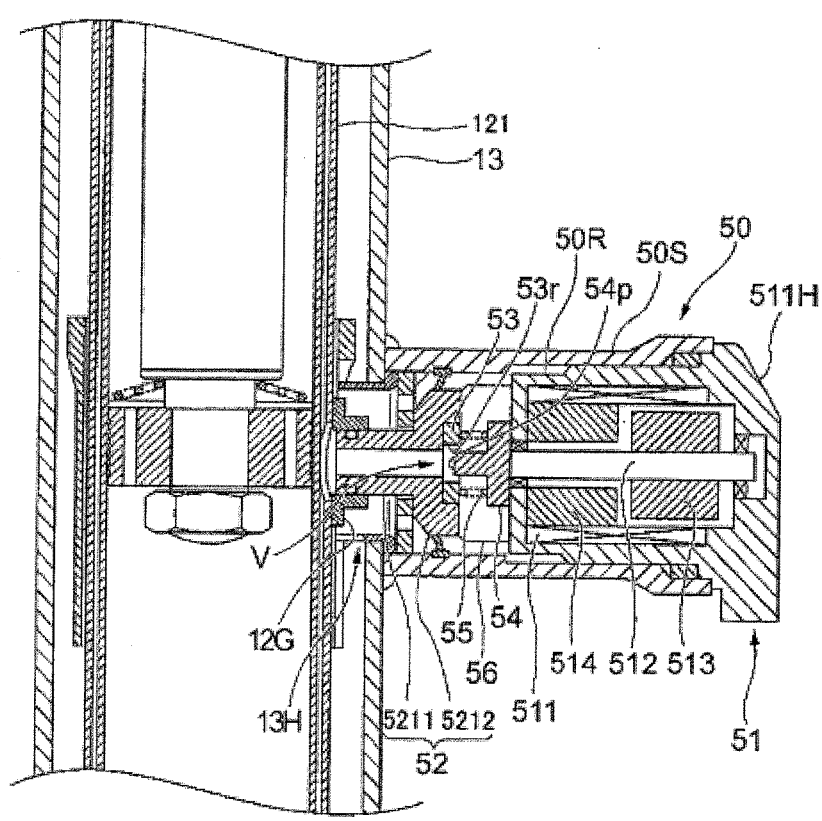
FIG. 4 is a cross-sectional view of a solenoid valve according to the first embodiment of the present invention.

FIG. 4 is a cross-sectional view of the solenoid valve 50 according to the first embodiment of the present invention. The solenoid valve 50 is provided on the side portion of the damper case 13. The solenoid valve 50 includes, as illustrated in FIG. 4, a solenoid cylinder 50S, a solenoid mechanism (solenoid) 51, a suction port 52, a valve stopper 53, a valve body 54, a spring 55, and a discharge ring 56.

The solenoid cylinder 50S is provided such that one opening in the axial direction faces a case opening 13H of the damper case 13. In this embodiment, the solenoid cylinder 50S is provided on the side of the damper case 13 to extend in a direction intersecting the axial direction of the damper case 13.

The solenoid mechanism 51 includes a coil 511, a housing 511H, a plunger 512, a magnetic body 513, and a stationary core 514.

The coil 511 is located along the axial direction of the plunger 512 and is held by the housing 511H. The coil 511 is coupled to a non-illustrated conductor and generates a magnetic field upon receipt of electric power via the conductor. The electric power supplied to the coil 511 is controlled by solenoid controllers 603A to 603D, which will be described later.

The plunger 512 is supported by the housing 511H via a bearing to be movable in the axial direction. The magnetic body 513 such as a magnet is securely mounted on the plunger 512. One end of the plunger 512 contacts the valve body 54.

The stationary core 514 is located closer to the valve body 54 than the magnetic body 513 in the axial direction of the plunger 512. The stationary core 514 is configured to be energized upon receipt of a magnetic field that is generated when electric power is supplied to the coil 511.

The suction port 52 is a member having an approximately cylindrical shape. In this embodiment, the suction port 52 includes a small diameter portion 5211 and a large diameter portion 5212. The diameter of the large diameter portion 5212 is greater than the diameter of the small diameter portion 5211. The small diameter portion 5211 is fitted inside a joint member 12G of an outer cylindrical body 121 via a sealing member. The large diameter portion 5212 faces the solenoid mechanism 51 with the discharge ring 56 located in between.

The valve stopper 53 is a thick cylindrical member and defines a ring-shaped passage 53r for oil on the inner side of the valve stopper 53. The valve stopper 53 is secured to the inner side of the large diameter portion 5212 of the suction port 52.

The valve body 54 is a columnar member and further has a columnar distal end 54p. The distal end 54p projects from the center portion of the valve body 54 in the axial direction. The valve body 54 is provided such that the distal end 54p faces the valve stopper 53 and is configured such that the distal end 54p regulates the ring-shaped passage 53r. The valve body 54 receives force from the plunger 512 at the end further from the valve stopper 53 and moves in the axial direction.

The spring 55 is located between the valve stopper 53 and the valve body 54. The spring 55 exerts spring force in a direction such that the distance between the valve stopper 53 and the valve body 54 is increased.

The discharge ring 56 is a columnar member and includes a plurality of circular openings that are formed on the outer surface in the circumferential direction. The discharge ring 56 is located around the valve stopper 53, the valve body 54, and the spring 55 and discharges the oil that has passed through a narrowed portion V, which will be described later, into a cylinder inner chamber 50R.

In this embodiment, the ring-shaped passage 53r of the valve stopper 53 and the distal end 54p of the valve body 54 define the narrowed portion V for the oil in the solenoid valve 50. That is, the solenoid valve 50 of this embodiment generates damping force by narrowing the cross-sectional area of the oil passage at the narrowed portion V. Varying the distance between the valve stopper 53 and the valve body 54 with the plunger 512 of the solenoid mechanism 51 further changes the cross-sectional area of the passage for the flow of oil to adjust the damping force.

Oil in the suspension may be electromagnetic fluid. The solenoid mechanism 51 may be a proportional solenoid. The proportional solenoid changes the projecting position of the plunger 512 in accordance with the value of the supplied current. Using the proportional solenoid allows the projecting position of the plunger 512 to be freely adjusted by, for example, changing the duty ratio as required.

Configuration of ECU 600

Figure 5:
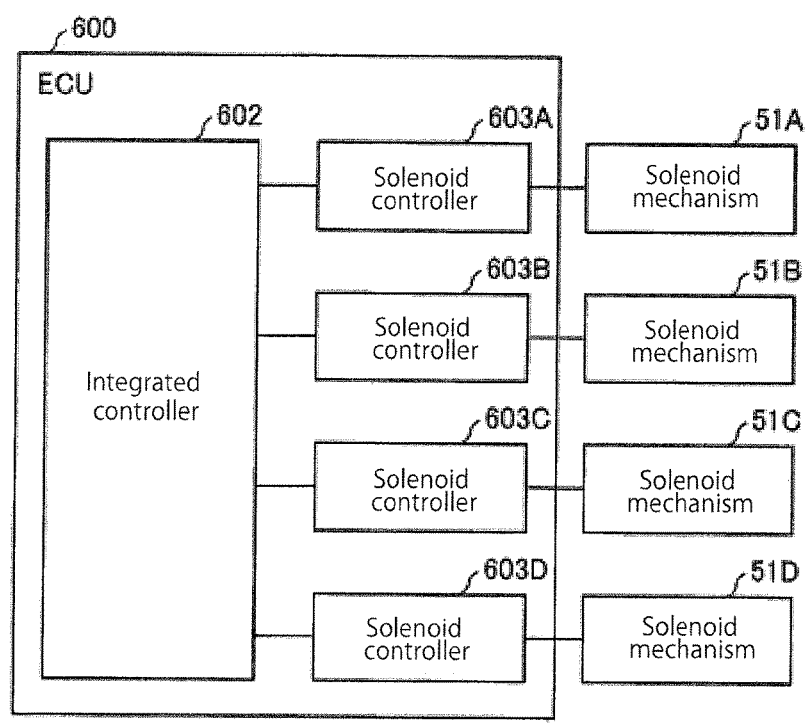
FIG. 5 is a block diagram illustrating the configuration of an ECU according to the first embodiment of the present invention.

FIG. 5 is a block diagram illustrating the configuration of the ECU 600 according to this embodiment. The ECU 600 includes an integrated controller 602 and the solenoid controllers 603A to 603D. The integrated controller 602 is capable of communicating with each of the solenoid controllers 603A to 603D and, in particular, transmits and receives a current limitation value. The current limitation value refers to the upper limit vale of current supplied by each of the solenoid controllers 603A, 603B, 603C, and 603D to the associated one of the solenoid mechanisms 51A, 51B, 51C, and 51D.

The solenoid controllers 603A to 603D transmit and receive the current limitation value to and from the integrated controller 602 and each adjust the value of current supplied to the associated one of the solenoid mechanisms 51A to 51D (the value of current supplied to the coil 511) based on the current limitation value. Details of the processing performed by the solenoid controllers 603A to 603D to adjust the current value of current supplied to the associated coil 511 will be described later.

The solenoid mechanisms 51A, 51B, 51C, and 51D respectively control damping forces of the suspensions of the front left wheel (FL), the front right wheel (FR), the rear left wheel (RL), and the rear right wheel (RR).

Configuration of Solenoid Controller 603A

Figure 6:
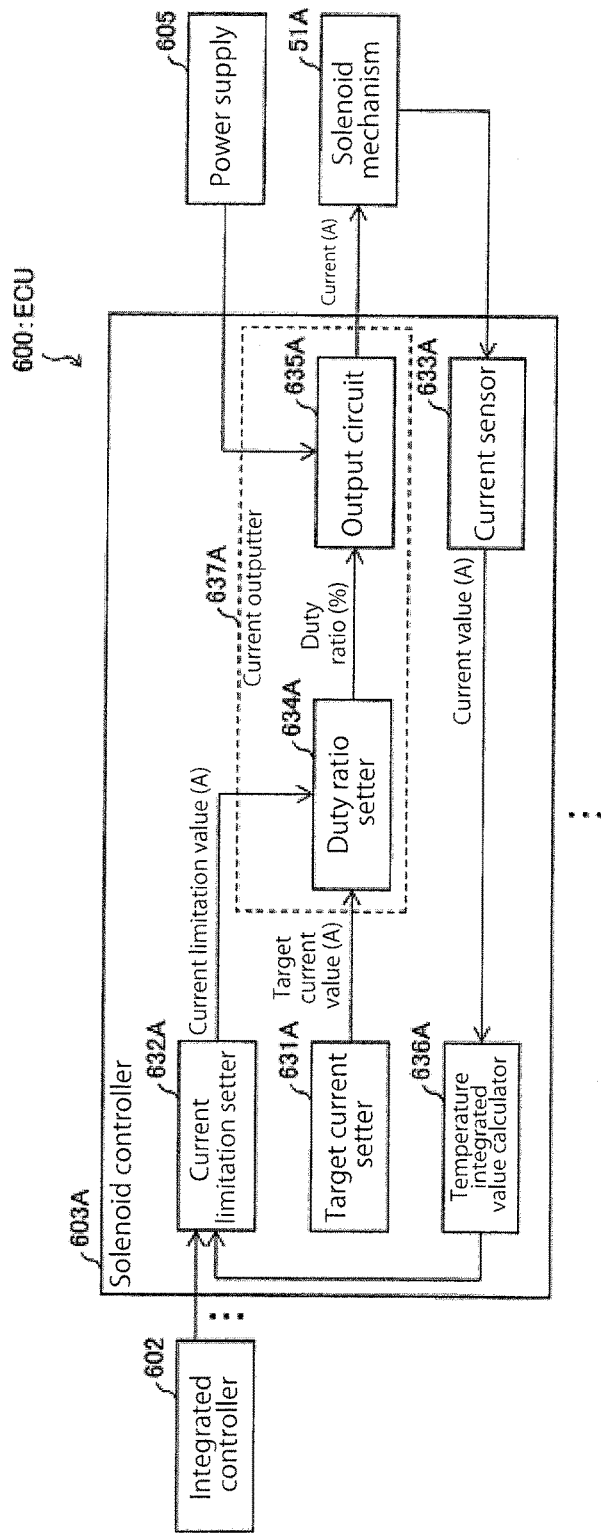
FIG. 6 is a block diagram illustrating the configuration of a solenoid controller according to the first embodiment of the present invention.

FIG. 6 is a block diagram illustrating the configuration of the solenoid controller 603A according to this embodiment. As illustrated in FIG. 6, the solenoid controller 603A includes a target current setting unit 631A, a current limitation setting unit 632A, a current sensor (current detector) 633A, a temperature integrated value calculator (estimated temperature calculator) 636A, and a current outputting unit 637A.

The target current setting unit 631A sets a target value of current (target current value) to be supplied to the solenoid mechanism 51A. More specifically, the target current setting unit 631A individually sets a target current value for the associated wheel in accordance with the traveling state of the vehicle 900. The target current value is set in accordance with, for example, a target damping force and the stroke speed of the suspension 100A. This embodiment, however, is not limited to the above method.

The current limitation setting unit 632A sets the current limitation value, which is the upper limit value of the current to be supplied to the solenoid mechanism 51A. The current limitation setting unit 632A appropriately adjusts the value of the current supplied to the solenoid mechanism 51A, which controls the damping force of the suspension, by setting the current limitation value. Details of the processing performed by the current limitation setting unit 632A for setting the current limitation value will be described later. The current limitation setting unit 632A is capable of communicating with the integrated controller 602, transmits the current limitation value that has been set to the integrated controller 602, receives a current limitation value in response to the transmission, and sets the received current limitation value.

The current sensor 633A detects the current value of the current supplied to the solenoid mechanism 51A.

The temperature integrated value calculator 636A calculates an estimated temperature of the associated coil 511 based on the current value detected by the current sensor 633A. The details of processing performed by the temperature integrated value calculator 636A for calculating the estimated temperature will be described later.

The current outputting unit 637A outputs current corresponding to the target current value set by the target current setting unit 631A, the current limitation value set by the current limitation setting unit 632A, and the power supply voltage to the solenoid mechanism 51A. For example, the current outputting unit 637A outputs current of a smaller value among the target current value and the current limitation value. The current outputting unit 637A includes a duty cycle setting unit 634A and an output circuit 635A as illustrated in FIG. 6. The output circuit 635A supplies the solenoid mechanism 51A with current corresponding to the duty cycle set by the duty cycle setting unit 634A and the voltage of the power supply 605 (power supply voltage).

The solenoid controllers 603B, 603C, and 603D have a configuration similar to the configuration of the solenoid controller 603A.

Relationship Between Temperature of Coil 511 and Time

One example of processing performed by the solenoid controller 603A for adjusting the value of current supplied to the coil 511 will now be described based on FIGS. 7 to 10.

Figure 7:
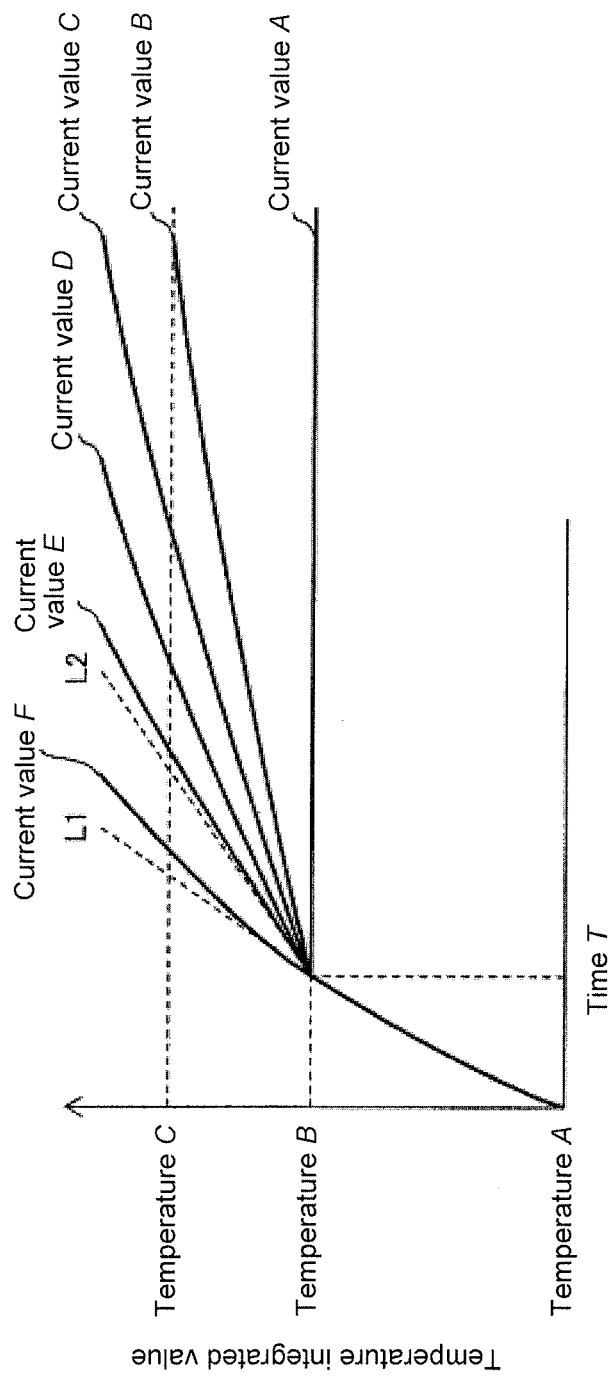
FIG. 7 is a graph illustrating a relationship between the temperature of the coil and the time for each of current values that flow through the coil.

FIG. 7 is a graph illustrating a relationship between the temperature of the coil 511 and the time for current values that may flow through the coil 511 in this embodiment. In the graph of FIG. 7, the vertical axis represents the temperature integrated value calculated by adding up the heat value of the coil 511 (in other words, the temperature of the coil 511), and the horizontal axis represents the time. A temperature C (first temperature) in FIG. 7 represents the upper limit value of the temperature permitted in the coil 511. The specific temperature of the temperature C may be, for example, 180 [° C.]. In FIG. 7, the relationship between current values A to F satisfies the following: current value A<current value B<current value C<current value D<current value E<current value F. The specific value of the current values A to F may include: the current value A=0.92 [A], the current value B=1.15 [A], the current value C=1.3 [A], the current value D=1.4 [A], the current value E=1.5 [A], and the current value F=1.6 [A].

As illustrated in FIG. 7, the current value that flows through the coil 511 may be in a range of the current values A to F. In this case, when time T has elapsed from when a temperature A is detected, the temperature of the coil 511 reaches a temperature B (second temperature) regardless of the level of the current value that flows through the coil 511. The specific temperature of the temperature A may be 100 [° C.] and the specific temperature of the temperature B may be 150 [° C.]. The temperature of the coil 511 after time T varies depending on the current value that flows through the coil 511. For example, when the value of current that flows through the coil 511 is the current value A, the temperature of the coil 511 is fixed at the temperature B after time T. In contrast, when the value of current that flows through the coil 511 is one of the current values B to F, the temperature of the coil 511 increases even after time T and reaches the temperature C. Processing for controlling the current that flows through the coil 511 by the solenoid controller 603A to prevent the temperature of the coil 511 from reaching the temperature C will be described below.

Processing of Solenoid Controller 603A after Ignition is Switched on

Figure 8:
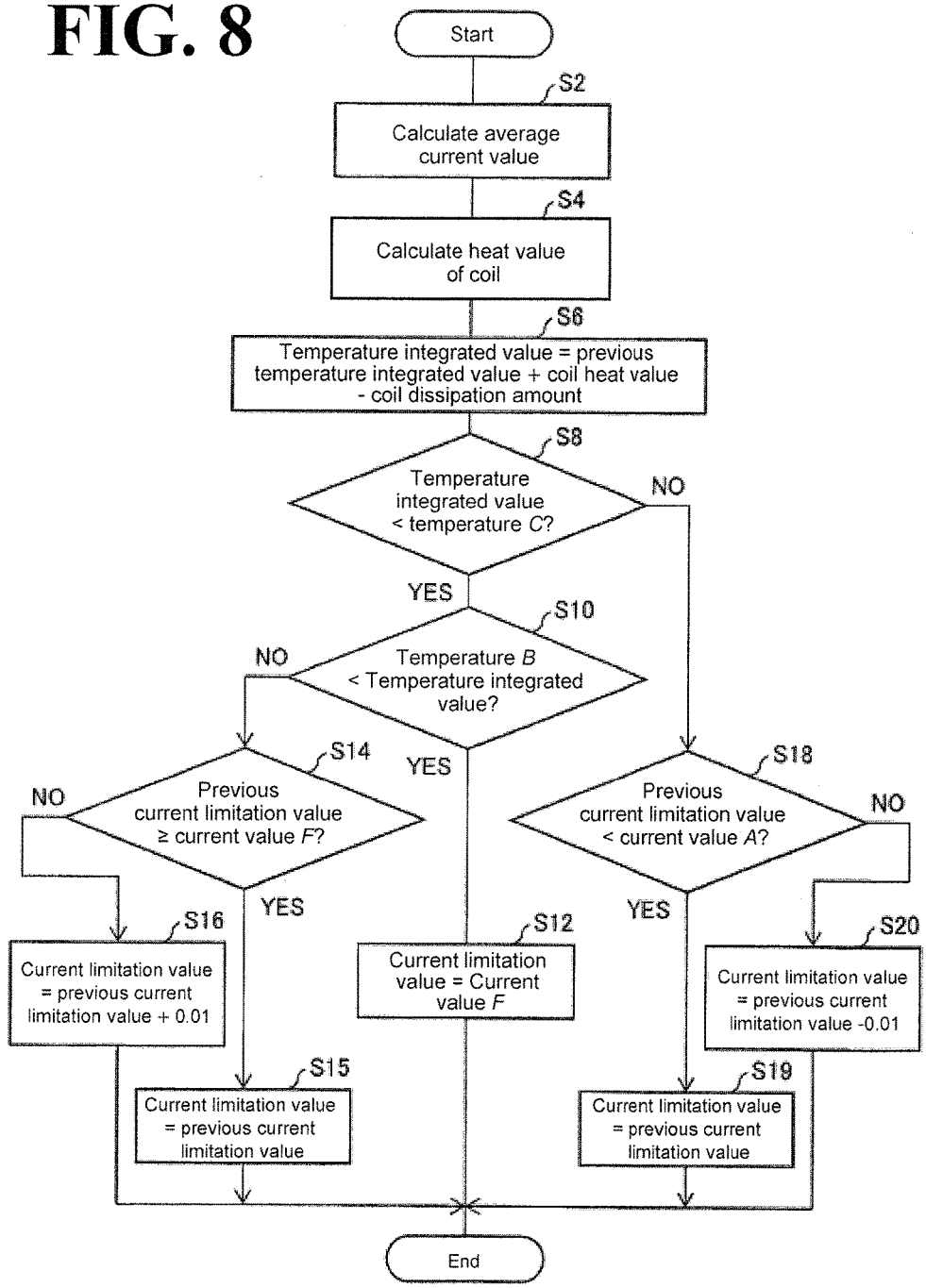
FIG. 8 is a flowchart illustrating one example of processing of the solenoid controller according to the first embodiment of the present invention.

FIG. 8 is a flowchart illustrating one example of the processing of the solenoid controller 603A according to this embodiment. The solenoid controller 603A repeatedly performs the processing of FIG. 8 at every predetermined period (for example, every 0.1 second or every 1 second) after the ignition of the vehicle 900 is switched on. Hereinafter, unless otherwise specified, a case in which the processing of FIG. 8 is performed at every 0.1 second will be described. The solenoid controllers 603B, 603C, and 603D perform processing similar to this processing.

Step S2

The temperature integrated value calculator 636A of the solenoid controller 603A makes reference to the current value detected by the current sensor 633A and calculates an average value of current that flowed through the coil 511 during a predetermined time period (in this embodiment, the predetermined time period is, but not limited to, one second as an example). The processing in which the temperature integrated value calculator 636A calculates the average value is not limited to specific processing. For example, in a configuration in which the processing of FIG. 8 is executed every one second, the temperature integrated value calculator 636A may set the current value detected by the current sensor 633A as the average current value of the current that flowed through the coil 511 during one second. In a configuration in which the processing of FIG. 8 is executed every 0.1 second, the temperature integrated value calculator 636A may calculate the average value of the last ten current values detected by the current sensor 633A and may set the obtained value as the average current value of the current that flowed through the coil 511 during one second.

Step S4

The temperature integrated value calculator 636A makes reference to the average current value calculated in step S2 and calculates (estimates) the heat value of the coil 511. Details of step S4 will be described later.

Step S6

The temperature integrated value calculator 636A adds the heat value of the coil 511 calculated in step S4 to the previous temperature integrated value, which is the temperature integrated value calculated immediately before, and subtracts the heat dissipation amount of the coil 511. In this manner, the temperature integrated value calculator 636A calculates the temperature integrated value (in other words, the temperature integrated value calculator 636A calculates the estimated temperature of the coil 511). The heat dissipation amount of the coil 511 may be a fixed value determined in accordance with, for example, the specification of the coil 511 or the installation place of the coil 511, or may be a value that varies in accordance with, for example, the outside air temperature.

As described above, when the value of current that flows through the coil 511 is in the range of the current values A to F, the temperature of the coil 511 reaches the temperature B after time T has elapsed from when the temperature A is detected regardless of the level of the value of current that flows through the coil 511. For this reason, the temperature integrated value calculated by the temperature integrated value calculator 636A in step S6 may be fixed to the temperature B until time T has elapsed from when the ignition switch of the vehicle 900 is switched on. The temperature integrated value calculator 636A may also perform the processing of step S6 before time T has elapsed with the initial value of the temperature integrated value set to the temperature B.

Step S8

The current limitation setting unit 632A determines whether the temperature integrated value calculated by the temperature integrated value calculator 636A is lower than the temperature C.

Step S10

When the determination made at step S8 is that the temperature integrated value is lower than the temperature C (step S8: YES), the current limitation setting unit 632A determines whether the temperature integrated value is higher than the temperature B.

Step S12

When the determination made at step S10 is that the temperature integrated value is higher than the temperature B (step S10: YES), the current limitation setting unit 632A sets the current limitation value to the current value F.

Step S14

When the determination made at step S10 is that the temperature integrated value is equal to or lower than the temperature B (step S10: NO), the current limitation setting unit 632A determines whether the previous current limitation value, which is the currently set current limitation value, is equal to or more than the current value F.

Step S15

When the determination made at step S14 is that the current limitation value is equal to or more than the current value F (step S14: YES), the current limitation setting unit 632A sets the current limitation value to a value equal to the previous current limitation value. In other words, the current limitation setting unit 632A does not change the value of the current limitation value.

Step S16

When the determination made at step S14 is that the current limitation value is less than the current value F (step S18: NO), the current limitation setting unit 632A sets the current limitation value to a value obtained by adding 0.01 [A] to the previous current limitation value. If the processing of FIG. 8 is performed at every one second, the current value added in step S16 may be 0.1 [A].

Step S18

When the determination made at step S8 is that the temperature integrated value is equal to or higher than the temperature C (step S8: NO), the current limitation setting unit 632A determines whether the previous current limitation value is less than the current value A.

Step S19

When the determination made at step S18 is that the current limitation value is less than the current value A (step S18: YES), the current limitation setting unit 632A sets the current limitation value to a value equal to the previous current limitation value. In other words, the current limitation setting unit 632A does not change the value of the current limitation value.

Step S20

When the determination made at step S18 is that the current limitation value is equal to or more than the current value A (step S18: NO), the current limitation setting unit 632A sets the current limitation value to a value obtained by subtracting 0.01 [A] from the previous current limitation value. If the processing of FIG. 8 is performed every one second, the current value subtracted in step S20 may be 0.1 [A].

As described above, when the temperature integrated value calculated by the temperature integrated value calculator 636A of the solenoid controller 603A is equal to or higher than the temperature C, the current limitation setting unit 632A decreases the current limitation value on a stepwise basis in step S20. When the temperature integrated value calculated by the temperature integrated value calculator 636A of the solenoid controller 603A is equal to or lower than the temperature B, the current limitation setting unit 632A increases the current limitation value on a stepwise basis in step S16. Thus, the solenoid controller 603A smoothly changes the damping force of the suspension.

Details of Processing in Step S4

Figure 9:
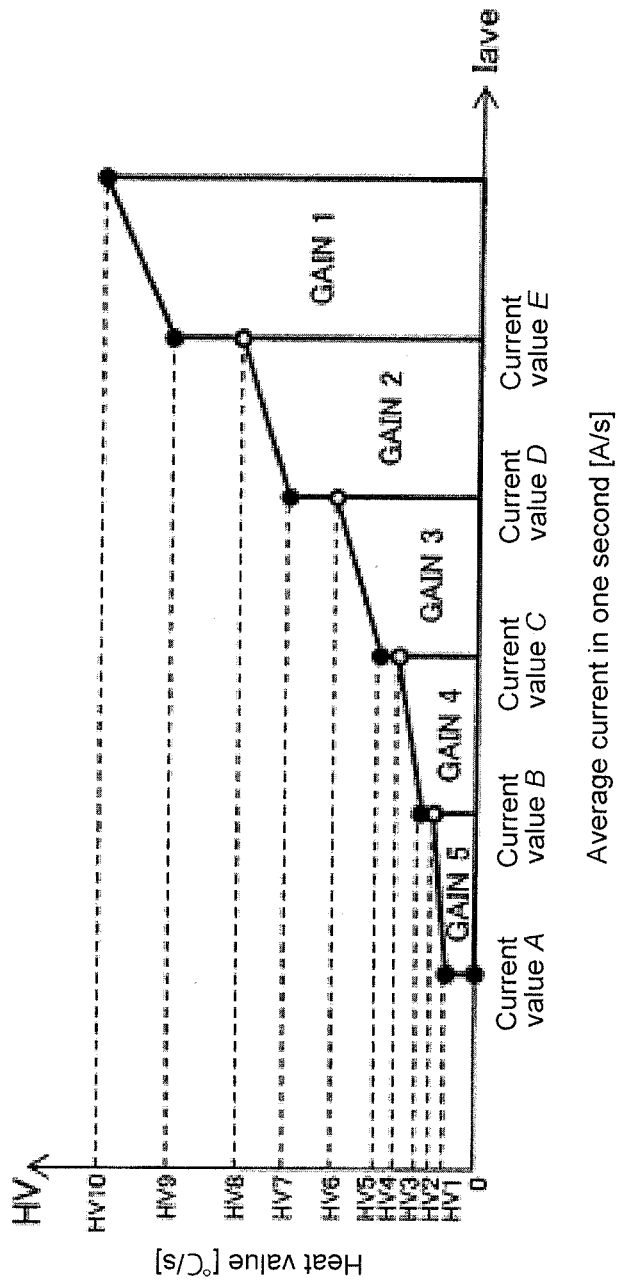
FIG. 9 is a graph illustrating an example of the relationship between the average current value of current that flows through the coil and the estimated heat value of the coil according to the first embodiment of the present invention.
Figure 10:
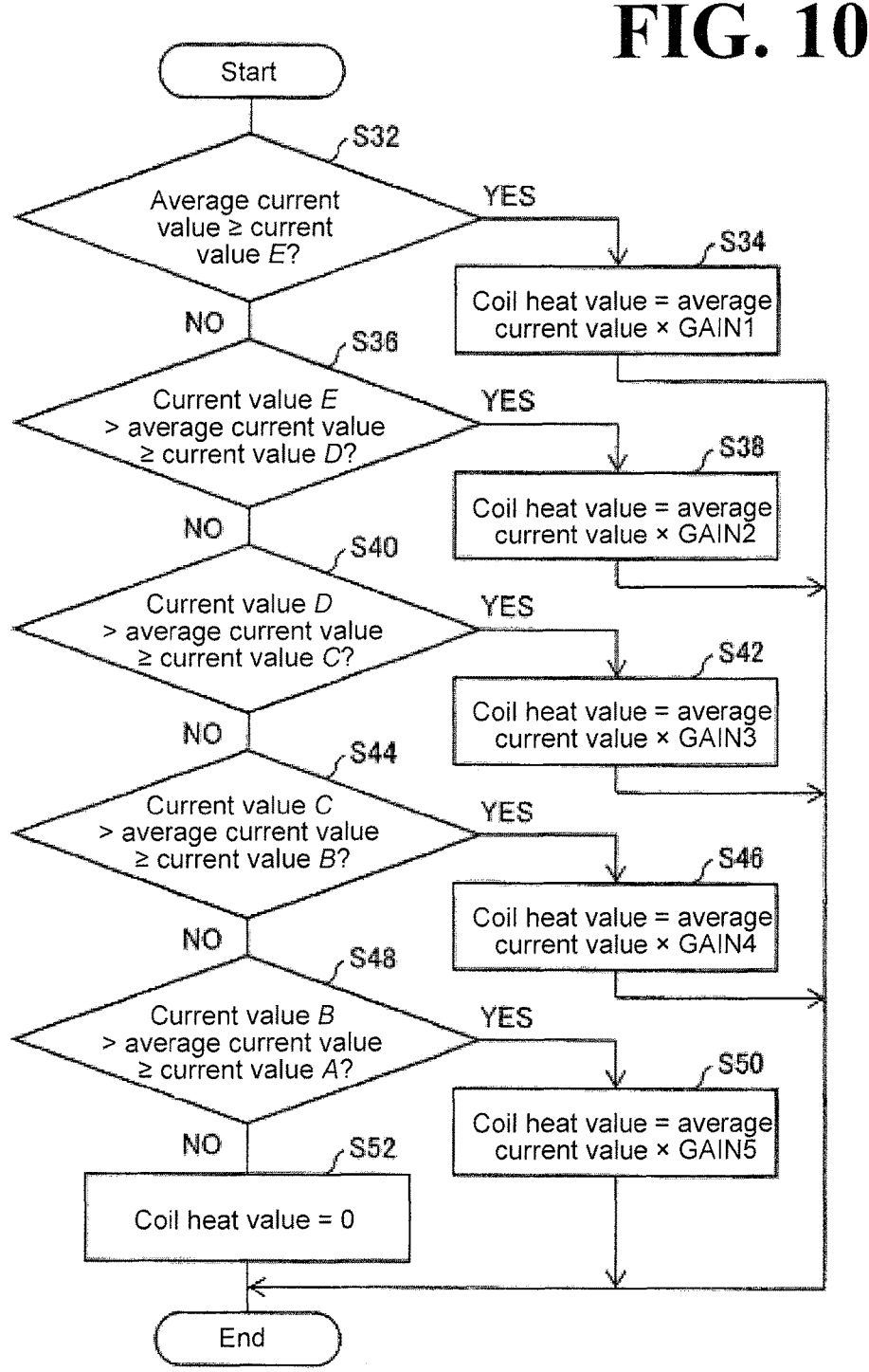
FIG. 10 is a flowchart illustrating the details of the processing of step S4 illustrated in FIG. 8.

Details of the processing in step S4 will be described based on FIGS. 9 and 10. FIG. 9 is a graph illustrating a relationship between the average current value of the current that flows through the coil 511 of this embodiment and the estimated heat value of the coil 511. The relationship between the average current value and the estimated heat value of the coil 511 will now be described based on FIG. 9.

Method 1 for Estimating Heat Value of Coil 511

As described based on FIG. 7, after time T has elapsed from when current started to flow through the coil 511, the temperature of the coil 511 varies depending on the value of current that flows through the coil 511. The heat value of the coil 511 corresponding to the current value of current that flows through the coil 511 is calculated by linear approximation using the graph illustrated in FIG. 7. The term "linear approximation" refers to calculating the heat value in a predetermined current value range using the following relationship:

$$y = ax + b$$

where x is the current value, y is the heat value, a is the slope, and b is the intercept (offset). Hereinafter, a method for estimating the heat value of the coil 511 using linear approximation will be described. In the linear approximation, the heat value that is based on the current value detected by the current sensor 633A is estimated using slopes each corresponding to one of a plurality of current ranges.

For example, when the average current value of current that flows through the coil 511 is the current value F, the slope GAIN 1 of the tangent L1 to the curved line of the current value F immediately after reaching the temperature B illustrated in FIG. 7 is calculated. When the average current value calculated in the above-described step S2 is equal to or more than the current value E and equal to or less than the current value F, the temperature integrated value calculator 636A sets the heat value of the coil 511 as the product of the average current value and the GAIN 1. Similarly, when the value of current that flows through the coil 511 is the current value E, the slope GAIN 2 of the tangent L2 to the curved line of the current value E immediately after reaching the temperature B is calculated. When the average current value calculated in the above-described step S2 is equal to or more than the current value D and less than the current value E, the temperature integrated value calculator 636A sets the heat value of the coil 511 as the product of the average current value and the GAIN 2. When the value of current that flows through the coil 511 is the current value D, C, or B, the GAIN is calculated in the same manner and is represented by GAIN 3, GAIN 2, or GAIN 1.

The heat value of the coil 511 estimated by this method and the average current value that flows through the coil 511 in one second has the relationship illustrated in the graph of FIG. 9. As illustrated in FIG. 9, when the current value is equal to or more than the current value E and equal to or less than the current value F, the product of the GAIN 1 having a great slope and the average current value is calculated as the heat value of the coil 511. In this case, the calculated heat value is equal to or more than a heat value HV9 and equal to or less than a heat value HV10. The graph illustrated in FIG. 9 schematically represents the GAIN applied in accordance with the value of the average current value. More specifically, the graph of FIG. 9 indicates that, when the average current value is equal to or more than the current value E and equal to or less than the current value F, the GAIN 1 is applied, and when the average current value is equal to or more than the current value D and less than the current value E, the GAIN 2 is applied.

As described above, calculating the heat value using linear approximation allows the heat value to be calculated by simple computation. Since the linear approximation is performed for each of the plurality of current ranges, the estimation accuracy of the heat value is inhibited from being decreased.

As illustrated in FIG. 7, although the increasing rate of the integrated temperature value is decreased as the time elapses after time T, the heat value of the coil 511 that is estimated by the above-described method is calculated using the GAIN at time T, at which the increasing rate of the integrated temperature value is the highest, even after time T. For this reason, use of the above-described method prevents the integrated temperature value (the estimated temperature of the coil 511) from being lower than the actual temperature.

The details of the processing of step S4 in the case of using the configuration in which the temperature integrated value calculator 636A estimates the heat value of the coil 511 will be described based on FIG. 10. FIG. 10 is a flowchart illustrating the details of the processing of step S4 in FIG. 8.

Step S32

First, the temperature integrated value calculator 636A determines whether the average current value calculated in step S2 is equal to or more than the current value E.

Step S34

When the determination made at step S32 is that the average current value is equal to or less than the current value F and equal to or more than the current value E (step S32: YES), the temperature integrated value calculator 636A sets the heat value of the coil 511 to a product of the average current value and the GAIN 1.

Step S36

When the determination made at step S32 is that the average current value is less than the current value E (step S32: NO), the temperature integrated value calculator 636A determines whether the average current value is less than the current value E and equal to or more than the current value D.

Step S38

When the determination made at step S36 is that the average current value is less than the current value E and equal to or more than the current value D (step S36: YES), the temperature integrated value calculator 636A sets the heat value of the coil 511 to a product of the average current value and the GAIN 2.

Step S40

When the determination made at step S36 is that the average current value is less than the current value D (step S36: NO), the temperature integrated value calculator 636A determines whether the average current value is less than the current value D and equal to or more than the current value C.

Step S42

When the determination made at step S40 is that the average current value is less than the current value D and equal to or more than the current value C (step S40: YES), the temperature integrated value calculator 636A sets the heat value of the coil 511 to a product of the average current value and the GAIN 3.

Step S44

When the determination made at step S40 is that the average current value is less than the current value C (step S40: NO), the temperature integrated value calculator 636A determines whether the average current value is less than the current value C and equal to or more than the current value B.

Step S46

When the determination made at step S44 is that the average current value is less than the current value C and equal to or more than the current value B (step S44: YES), the temperature integrated value calculator 636A sets the heat value of the coil 511 to a product of the average current value and the GAIN 4.

Step S48

When the determination made at step S44 is that the average current value is less than the current value B (step S44: NO), the temperature integrated value calculator 636A determines whether the average current value is less than the current value B and equal to or more than the current value A.

Step S50

When the determination made at step S48 is that the average current value is less than the current value B and equal to or more than the current value A (step S48: YES), the temperature integrated value calculator 636A sets the heat value of the coil 511 to a product of the average current value and the GAIN 5.

Step S52

When the determination made at step S48 is that the average current value is less than the current value A (step S52: NO), the temperature integrated value calculator 636A sets the heat value of the coil 511 to zero.

As described above, in the solenoid controller 603A, the current outputting unit 637A supplies the coil 511 with current corresponding to the target current value, the current limitation value, and the power supply voltage, and the temperature integrated value calculator 636A calculates the estimated temperature (temperature integrated value) of the coil 511 based on the current value detected by the current sensor 633A. The current limitation setting unit 632A changes the current limitation value based on the estimated temperature that has been calculated. Thus, the solenoid controller 603A appropriately adjusts the value of current that flows through the coil 511 such that the coil 511 is not excessively heated.

When the value of current that flows through the coil 511 is equal to or more than the current value A that increases the temperature of the coil 511 to a value equal to or higher than the temperature B, the solenoid controller 603A calculates the heat value used to calculate the estimated temperature. In other words, the solenoid controller 603A does not execute the processing for calculating the heat value of the coil 511 when the value of current that flows through the coil 511 is less than a current value that excessively heats the coil 511. Thus, the solenoid controller 603A appropriately adjusts the value of current supplied to the coil 511 with simple processing.

The temperature integrated value calculator 636A of the solenoid controller 603A calculates the temperature integrated value (estimated temperature) of the coil 511 by obtaining the heat value that is based on the current value detected by the current sensor 633A using linear approximation. Thus, the solenoid controller 603A appropriately adjusts the value of current that flows through the coil 511 by easy processing such that the coil 511 is not excessively heated.

Processing of Solenoid Controller 603A after Ignition is Switched Off

Figure 11:
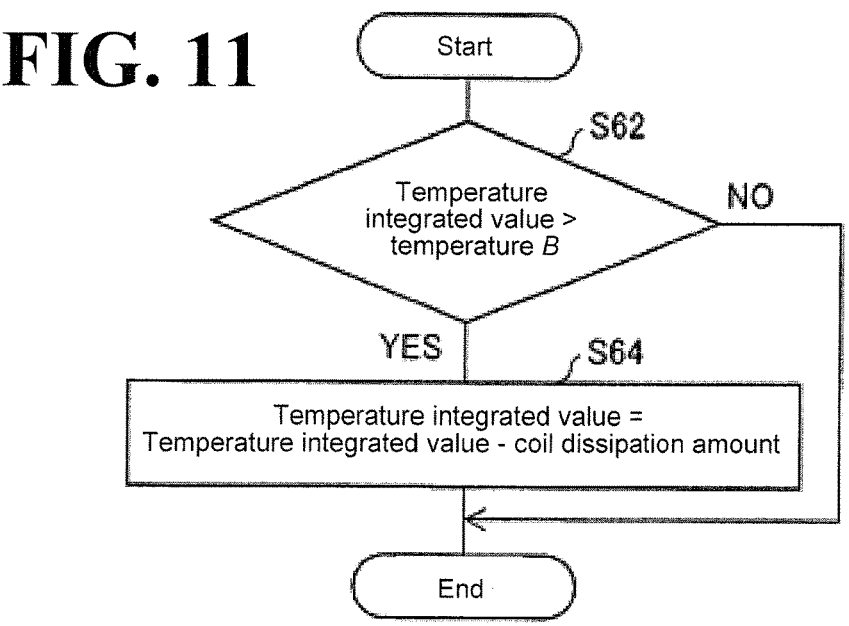
FIG. 11 is a flowchart illustrating another example of the processing of the solenoid controller according to the first embodiment of the present invention.

The processing of the solenoid controller 603A after the ignition of the vehicle 900 is switched off will be described based on FIG. 11. FIG. 11 is a flowchart illustrating another example of the processing of the solenoid controller 603A according to this embodiment. The solenoid controller 603A repeatedly performs the processing of FIG. 8 after the ignition of the vehicle 900 is switched on at every predetermined time period (for example, 0.1 second or 1 second). The solenoid controllers 603B, 603C, and 603D perform processing similar to this processing.

Step S62

The temperature integrated value calculator 636A determines whether the temperature integrated value calculated immediately before is higher than the temperature B.

Step S64

When the determination made at step S62 is that the temperature integrated value is higher than the temperature B (step S62: YES), the temperature integrated value calculator 636A calculates the temperature integrated value by subtracting the heat dissipation amount of the coil 511 from the temperature integrated value calculated immediately before.

When the determination made at step S62 is that the temperature integrated value is lower than the temperature B (step S62: NO), the temperature integrated value calculator 636A does not change the temperature integrated value.

In this manner, the temperature integrated value calculator 636A of the solenoid controller 603A calculates the temperature integrated value even after the ignition is switched off. Thus, even if the ignition of the vehicle 900 is switched on immediately after the ignition is switched off, and the temperature of the coil 511 is high, the solenoid controller 603A calculates an appropriate temperature integrated value. The processing of FIG. 11 may also be configured such that when the determination made at step S62 is that the temperature integrated value is lower than the temperature B (step S62: NO), the processing is not performed from then on. This configuration reduces electric power consumed by the solenoid controller 603A.

Processing of Integrated Controller 602

Figure 12:
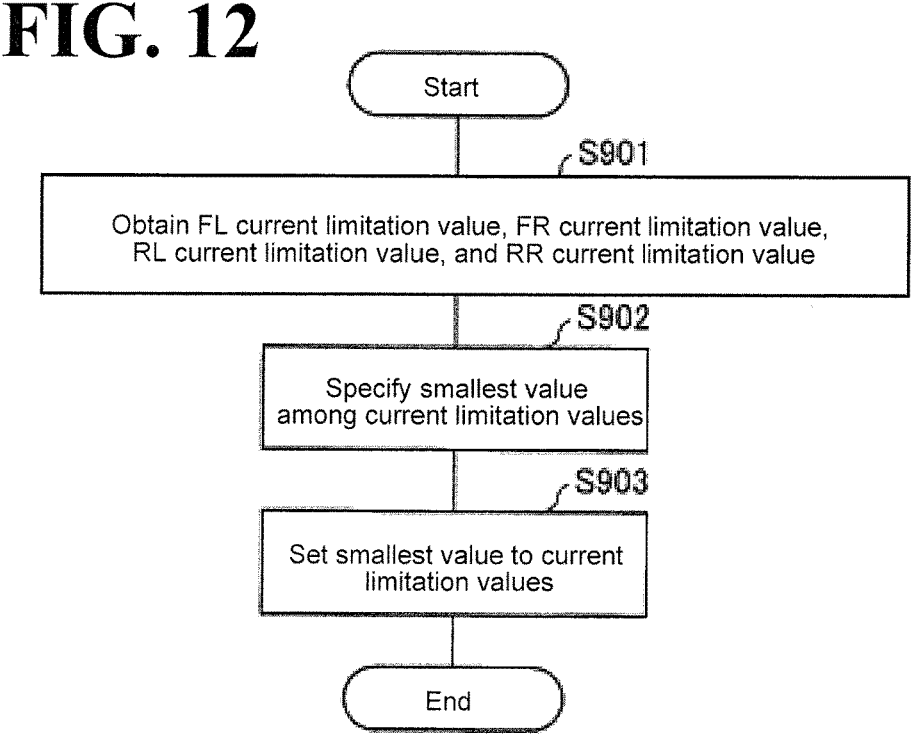
FIG. 12 is a flowchart illustrating processing of an integrated controller according to the first embodiment of the present invention.

FIG. 12 is a flowchart illustrating processing of the integrated controller 602 according to this embodiment. This processing is performed at the end of each processing of the solenoid controllers 603A, 603B, 603C, and 603D performed at every 0.1 second.

First, the integrated controller 602 obtains the FL current limitation value, the FR current limitation value, the RL current limitation value, and the RR current limitation value (S901). More specifically, the integrated controller 602 obtains the FL current limitation value from the current limitation setting unit 632A, the FR current limitation value from the current limitation setting unit 632B, the RL current limitation value from the current limitation setting unit 632C, and the RR current limitation value from the current limitation setting unit 632D.

Subsequently, the integrated controller 602 specifies the minimum value among the FL current limitation value, the FR current limitation value, the RL current limitation value, and the RR current limitation value that have been obtained (S902).

The integrated controller 602 then sets the specified minimum value as the FL current limitation value, the FR current limitation value, the RL current limitation value, and the RR current limitation value (S903). More specifically, the integrated controller 602 sends the specified minimum value to the current limitation setting units 632A, 632B, 632C, and 632D.

Upon execution of the above-described processing, the current limitation setting unit 632A makes reference to the current limitation value corresponding to the FL suspension and performs processing for setting a new current limitation value corresponding to the FL suspension. This configuration appropriately adjusts the value of current supplied to the solenoid of each suspension in accordance with the current limitation value corresponding to each suspension.

More specifically, in the processing to set a new FL current limitation value corresponding to the FL suspension, the current limitation setting unit 632A sets the lowest current limitation value among the current limitation values corresponding to the suspensions as a new current limitation value corresponding to the FL suspension. This configuration limits the value of current supplied to the solenoid mechanism 51A. The current limitation setting units of the solenoid controllers 603B, 603C, and 603D also perform processing similar to this processing.

Second Embodiment

In the above-described embodiment, the heat value of the coil 511 is estimated using linear approximation. In this embodiment, a method for estimating the heat value of the coil 511 using zeroth-order approximation of the heat value that is based on the current value detected by the current sensor 633A will be described.

Method 2 for Estimating Heat Value of Coil 511

A method in which the temperature integrated value calculator 636A of this embodiment estimates the heat value of the coil 511 will be described based on FIG. 13. Since other configurations of this embodiment are the same as the configurations of the first embodiment, the detailed descriptions are omitted.

Figure 13:
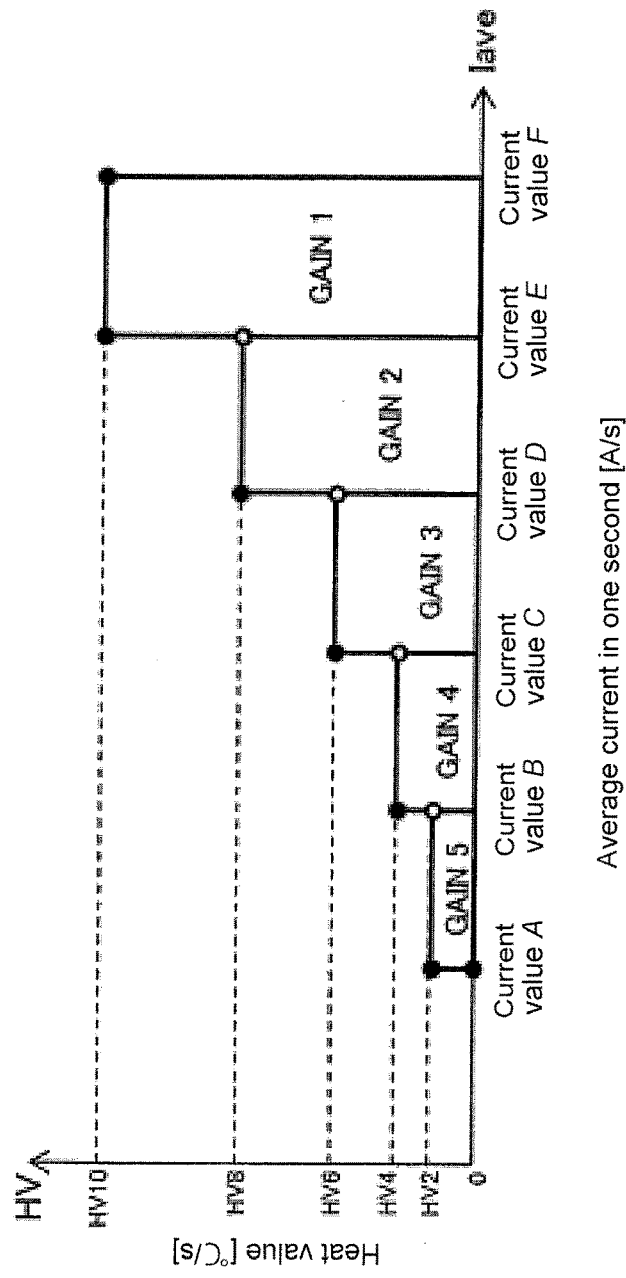
FIG. 13 is a graph illustrating an example of the relationship between the average current value of current that flows through the coil and the estimated heat value of the coil according to a second embodiment of the present invention.

FIG. 13 is a graph illustrating an example of the relationship between the average current value of the current that flows through the coil 511 and the estimated heat value of the coil 511 in this embodiment.

First, like the example described above, GAIN 5 to GAIN 1 are calculated. The GAIN 5 to GAIN 1 are the slopes of the tangents to the curved lines at time T in the cases in which the average current values are the current values B to F in FIG. 7. Subsequently, when the average current value is equal to or more than the current value E and equal to or less than the current value F, the temperature integrated value calculator 636A estimates that the heat value of the coil 511 is the product of the current value F and the GAIN 1. Similarly, when the average current value is less than the current value E and equal to or more than the current value D, the temperature integrated value calculator 636A estimates that the heat value of the coil 511 is the product of the current value E and the GAIN 2. When the average current value is less than the current value D, the heat value of the coil is estimated in the same manner.

The heat value of the coil 511 estimated by this method and the average current value of the current that flows through the coil 511 in one second has the relationship illustrated in the graph of FIG. 13. As illustrated in FIG. 13, when the current value is equal to or more than the current value E and equal to or less than the current value F, the product of the GAIN 1 and the current value F is calculated as the heat value of the coil 511. In this case, the calculated heat value is a heat value HV10. Like FIG. 9 described above, the graph of FIG. 13 schematically illustrates the GAIN applied in accordance with the value of the average current value. More specifically, the graph of FIG. 13 indicates that, when the average current value is equal to or more than the current value E and equal to or less than the current value F, the GAIN 1 is applied, and when the average current value is equal to or more than the current value D and less than the current value E, the GAIN 2 is applied.

As described above, calculating the heat value using the zeroth-order approximation allows the heat value to be calculated with a simple computation. Since the zeroth-order approximation is performed for each of the plurality of current ranges, the estimation accuracy of the heat value is inhibited from being decreased.

When the current value is in a range of a first current value to a second current value (first current value <second current value), the heat value of the coil 511 estimated by this method is a heat value calculated on the presumption that current of the second current value flows through the coil 511. For this reason, using this method also prevents the integrated temperature value (estimated temperature of the coil 511) from being lower than the actual temperature. Thus, the solenoid controller 603A appropriately adjusts the value of current that flows through the coil 511 with easy processing such that the coil 511 is not excessively heated.

Third Embodiment

In the above-described first embodiment, the configuration in which the initial value of the temperature integrated value is set to the temperature B is described as an example. However, the initial value of the temperature integrated value may be set to the temperature A. In this case, the heat value of the coil 511 is estimated as a predetermined value from when the ignition of the vehicle 900 is switched on until time T has elapsed regardless of the value of current that flows through the coil 511. An example of the predetermined value includes a value calculated using linear approximation of the curved line until time T in the graph illustrated in FIG. 7. With this configuration, since the heat value of the coil 511 is set to the predetermined value until time T has elapsed, the temperature integrated value calculator 636A of the solenoid controller 603A appropriately adjusts the value of current that flows through the coil 511 by easy processing such that the coil 511 is not excessively heated.

Implementation Using Software

A control block of the ECU 600 (in particular, the integrated controller 602 and the solenoid controllers 603A, 603B, 603C, 603D) may be implemented by a logic circuit (hardware) formed on, for example, an integrated circuit (IC chip) or by a software using a central processing unit (CPU).

In the latter case, the ECU 600 includes a CPU, a read only memory (ROM) or a recording device (referred to as a recording medium), and a random access memory (RAM). The CPU executes a command of a program, which is software for performing each function. The ROM stores the above-described program and various data to be readable by a computer (or the CPU). The RAM develops the above-described program. The object of the present invention is achieved by reading the above-described program from the above-described recording medium by the computer (or the CPU) and executing the program. The above-described recording medium may be "a non-temporary concrete medium" such as a tape, a disk, a card, a semiconductor memory, or a programmable logical circuit. The above-described program may be supplied to the above-described computer via a transmitting medium (such as a communication network and airwave) that is capable of transmitting the program. The embodiments of the present invention may be implemented by electronically transmitting the above-described program in a form of data signals embedded in a carrier wave.

The current value of current supplied to the solenoid of the suspension is preferably controlled in an appropriate manner.

The suspension controller of the present invention appropriately adjusts the value of the current supplied to the solenoid that controls the damping force of the suspension.

Obviously, numerous modifications and variations of the present invention are possible in light of the above teachings. It is therefore to be understood that within the scope of the appended claims, the present disclosure may be practiced otherwise than as specifically described herein.

What is claimed is:

1. A suspension controller comprising:
   a target current setting unit configured to set a target current value;
   a current limitation setting unit configured to set a current limitation value;
   a current outputting unit configured to supply a solenoid with a current that is based on the target current value, based on the current limitation value, and based on a power supply voltage, the solenoid being configured to control a damping force of a suspension;
   a current detector configured to detect a current value of the current supplied to the solenoid; and
   an estimated temperature calculator configured to calculate an estimated temperature of the solenoid based on the current value detected by the current detector,
   wherein the current limitation setting unit changes the current limitation value based on the estimated temperature, and
   the estimated temperature calculator is configured to perform at least one of linear approximation and zeroth-order approximation of a heat value that is based on the current value detected by the current detector, so as to calculate the estimated temperature of the solenoid.

2. The suspension controller according to claim 1, wherein the estimated temperature calculator is configured to perform at least one of linear approximation and zeroth-order approximation of a heat value that is based on the current value detected by the current detector using at least one of a slope and an offset that are determined for each of a plurality of current ranges, so as to calculate the estimated temperature of the solenoid.

3. The suspension controller according to claim 2, wherein when the current value detected by the current detector is equal to or more than a predetermined value, the estimated temperature calculator is configured to calculate a heat value used to calculate the estimated temperature of the solenoid based on the current value.

4. The suspension controller according to claim 3, wherein when the estimated temperature calculated by the estimated temperature calculator is equal to or higher than a first temperature, the current limitation setting unit is configured to decrease the current limitation value on a stepwise basis.

5. The suspension controller according to claim 2, wherein when the estimated temperature calculated by the estimated temperature calculator is equal to or higher than a first temperature, the current limitation setting unit is configured to decrease the current limitation value on a stepwise basis.

6. The suspension controller according to claim 2, wherein when the estimated temperature calculated by the estimated temperature calculator is equal to or lower than a second temperature, the current limitation setting unit is configured to increase the current limitation value on a stepwise basis.

7. The suspension controller according to claim 1,
   wherein when the current value detected by the current detector is equal to or more than a predetermined value, the estimated temperature calculator is configured to calculate, based on the current value, a heat value used to calculate the estimated temperature of the solenoid.

8. The suspension controller according to claim 7, wherein when the estimated temperature calculated by the estimated temperature calculator is equal to or higher than a first temperature, the current limitation setting unit is configured to decrease the current limitation value on a stepwise basis.

9. The suspension controller according to claim 7, wherein when the estimated temperature calculated by the estimated temperature calculator is equal to or lower than a second temperature, the current limitation setting unit is configured to increase the current limitation value on a stepwise basis.

10. The suspension controller according to claim 1,
    wherein when the estimated temperature calculated by the estimated temperature calculator is equal to or higher than a first temperature, the current limitation setting unit is configured to decrease the current limitation value on a stepwise basis.

11. The suspension controller according to claim 10, wherein when the estimated temperature calculated by the estimated temperature calculator is equal to or lower than a second temperature, the current limitation setting unit is configured to increase the current limitation value on a stepwise basis.

12. The suspension controller according to claim 1,
    wherein when the estimated temperature calculated by the estimated temperature calculator is equal to or lower than a second temperature, the current limitation setting unit is configured to increase the current limitation value on a stepwise basis.

13. A suspension apparatus comprising a plurality of suspensions and the suspension controller according to claim 12.

14. A suspension apparatus comprising a suspension and the suspension controller according to claim 1.

15. The suspension controller according to claim 1, wherein when the current value detected by the current detector is equal to or more than a predetermined value, the estimated temperature calculator is configured to calculate a heat value used to calculate the estimated temperature of the solenoid based on the current value.

16. The suspension controller according to claim 15, wherein when the estimated temperature calculated by the estimated temperature calculator is equal to or higher than a first temperature, the current limitation setting unit is configured to decrease the current limitation value on a stepwise basis.

17. The suspension controller according to claim 1, wherein when the estimated temperature calculated by the estimated temperature calculator is equal to or higher than a first temperature, the current limitation setting unit is configured to decrease the current limitation value on a stepwise basis.

18. The suspension controller according to claim 1, wherein when the estimated temperature calculated by the estimated temperature calculator is equal to or lower than a second temperature, the current limitation setting unit is configured to increase the current limitation value on a stepwise basis.

19. A suspension controller comprising:
target current setting units, each of the target current setting units corresponding to one of a plurality of suspensions of a vehicle and configured to set a target current value;
current limitation setting units, each of the current limitation setting units corresponding to one of the plurality of suspensions and configured to set a current limitation value;
current outputting units, each of the current outputting units corresponding to one of the plurality of suspensions and configured to supply an associated solenoid with a current that is based on the target current value, based on the current limitation value, and based on a power supply voltage, the solenoid being one of solenoids that are configured to control damping forces of the plurality of suspensions;
current detectors, each of the current detectors corresponding to one of the plurality of suspensions and configured to detect a current value of the current supplied to the associated solenoid; and
estimated temperature calculators, each of the estimated temperature calculators corresponding to one of the plurality of suspensions and configured to calculate an estimated temperature of the associated solenoid based on the current value detected by the current detector,
wherein the current limitation setting unit corresponding to the one suspension is configured to:
change the current limitation value based on the estimated temperature calculated by the estimated temperature calculator; and
set, as a new current limitation value corresponding to the one suspension, a lowest current limitation value among current limitation values respectively corresponding to the suspensions.

* * * * *